US007240072B2

(12) United States Patent
McKnight et al.

(10) Patent No.: US 7,240,072 B2
(45) Date of Patent: Jul. 3, 2007

(54) DYNAMIC GENERIC FRAMEWORK FOR DISTRIBUTED TOOLING

(75) Inventors: David K. McKnight, Aurora (CA); Robert S. Cecco, Richmond Hill (CA); Jeffrey C. Turnham, Markham (CA)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 10/134,190

(22) Filed: Apr. 29, 2002

(65) Prior Publication Data

US 2003/0097369 A1 May 22, 2003

(30) Foreign Application Priority Data

Oct. 31, 2001 (CA) .................................. 2360645

(51) Int. Cl.
*G06F 7/00* (2006.01)
*G06F 17/00* (2006.01)

(52) U.S. Cl. ................... 707/103 Y; 707/100
(58) Field of Classification Search ............... 707/100, 707/103 Y, 10, 1; 717/105, 116; 715/500
See application file for complete search history.

(56) References Cited

U.S. PATENT DOCUMENTS

| 5,999,728 A | * | 12/1999 | Cable .......................... 717/105 |
| 6,061,515 A | * | 5/2000 | Chang et al. ................ 717/114 |
| 6,064,382 A | * | 5/2000 | Diedrich et al. ............. 715/700 |
| 6,970,883 B2 | * | 11/2005 | Ku et al. ................. 707/103 Y |

* cited by examiner

*Primary Examiner*—Sam Rimell
(74) *Attorney, Agent, or Firm*—Martin J. McKinley; Dillon & Yudell LLP

(57) ABSTRACT

A dynamic generic framework for distributed tooling comprising a system for creating, storing and manipulating objects, which includes a datastore, a user interface and tools. In a distributed or client-server environment, a virtual datastore is created on the client, through which updates to the user interface and commands to the tools are routed. Commands and updates are transmitted asynchronously through handlers. The objects in the datastore are all of the same kind and have a predetermined generic or uniform attribute set. The schema is comprised of schema objects in the datastore which schema objects are dynamically created by the tools. The user interface perceives and comprehends the schema and utilizes the schema to identify and display objects in the datastore, the relationships therebetween, and the commands that can be executed thereon.

10 Claims, 11 Drawing Sheets

```
Root_>descriptor descriptor
        _>"objectdescriptor" objectdescriptor
        _"commanddescriptor" commanddescriptor
        _>"relationdescriptor" relationdescriptor
        _>"log" objectdescriptor
        _>"host" objectdescriptor
        _>"contents" relationdescriptor
        _>"parent" relationdescriptor
        _>"inheritance" relationdescriptor
        _>"miner" objectdescriptor
                _>"contents" relation to "data" objectdescriptor
        _>"data" objectdescriptor
        _>"state" objectdescriptor
        _>"environment" objectdescriptor
        _>"directory" objectdescriptor
                _>"contents" relation to "file" objectdescriptor
                _>"query" commanddescriptor
                _>"contents" relation to "contents" relationdescriptor
                _>"contents" relation to"parent" relationdescriptor _>"file" objectdescriptor
                _>"parent" relation to "director" objectdescriptor
                _>"build" commanddescriptor _>"class" objectdescriptor
                _>"contents" relation to "inheritance" relationdescriptor _>"127.0.0.1" host
        _>"FileSystem" miner
                _>"ls miner data" data
                        _>"myDirectory" directory
                                _>"my File" file _>"ls miner state" state
                _>"ls miner environment" environment _>"C++parser" miner
                _>"c++ miner data" data
                        _>"A" class
                                _>inheritance relation to "B" class
                        _>"B" class _>"my log" log
        _>"query" command
                _>"argument" relation to "myDirectory" directory
                _>"status" status
                        _>"duration" time
                                _>"1ms" property
```

DYNAMIC GENERIC FRAMEWORK FOR DISTRIBUTED TOOLING

BACKGROUND OF THE INVENTION

1. Field of the Invention

This invention relates generally to the field of data object creation and manipulation, and more particularly, to object creation and manipulation in both distributed and non-distributed environments.

2. Description of the Related Art

Integrated development environments ("IDEs") are used for the development of software. A typical IDE consists of a user interface, a repository of information, and tools. The function of the user interface is to provide a user-friendly means of viewing, and performing actions on, the information in the repository in an integrated way. The purpose of the repository is to maintain information, both at run time and persistently.

The tools are used to populate the repository. They perform operations on the information contained in the repository, and are also driven by that information, so that the results of the operations performed by the tools depend on what information is contained in the repository. Examples of tools often found in IDEs include parsers, code generators, linkers, search tools and file system management tools.

In such a typical IDE, the tools and repository are configured so as to be able to communicate with one another, in order to allow the tools to perform operations on the information in the repository, and to receive information from the repository to allow the tools to perform the required operations. The user interface is configured so as to communicate directly with the repository, in order to allow it to display, in a user-friendly manner, the information contained in the repository. The user interface communicates directly with the repository in order to provide the user with access to the information therein. The user interface also communicates with the tools in order to provide the user with a means of applying the tools to the information within the repository as the user desires.

Thus, this typical architecture provides a close integration among the user interface, repository and tools. This close integration has its benefits. Specifically, the close integration provides the user with a rich and more complete pool of information within the repository. Also, there is a comprehensive interface from the user interface into the tools.

Furthermore, in a typical IDE, at least the tools and the repository are written in the same language. This is done to provide a performance benefit in the form of higher speed and more comprehensive functionality. Furthermore, the repository and/or the tools are also typically written in platform-specific languages. This is also intended to increase performance, provide greater speed, and allow for the closer integration of the tools with the repository.

However, this architecture presents a number of problems. The first, is that the close integration between the user interface, tools and repository creates interdependencies between those components. Specifically, the close integration of the user interface, repository and tools means that each of these components is built around the specific features of the other components. The result is that if it is desired to change or substitute any one of these components, then it may be necessary to change or substitute the remainder of the components. Another related result is that porting any part of the system to another platform is very difficult, because when one of the components is changed to accommodate its new platform, the other components will need to be changed as well.

Second, the above-described architecture is poorly suited to a distributed, heterogenous development environment in which different components are housed on different platforms. As stated above, the components are often written in platform-specific languages. Thus, in a tightly coupled system, components on different platforms will be unable to communicate with one another unless additional software is added to facilitate such communication. However, this additional software layer is likely to compromise the performance of the system, precisely because it would have the effect of loosening the coupling between the components and preventing them from communicating with one another in a direct manner.

It will be appreciated that, because of the tight coupling of the components of the typical IDE, it is likely to be relatively inflexible. This is because, as stated above, for reasons of performance the components are designed and written with the specific existing features of the other components in mind. In other words, each component expects the other components to have the specific features that those other components have. Therefore, this tight coupling often makes it difficult to add additional features to an existing IDE. In particular, it may be difficult to extend tool functionality within a typical IDE, because the repository and user interface were not designed with that additional functionality in mind. Thus, additional functionality would require significant changes to the other components as well.

It will also be appreciated that these problems are not unique to IDEs. Many computer systems have a general architecture consisting of a user interface, a data repository and tools. Examples include word processors and chatroom systems, to name but two. The above-described difficulties can also arise in these other systems.

U.S. Pat. No. 6,134,581 discloses a method and system for remotely browsing objects. The system includes a management framework for a network management system. Various management services can be loaded or plugged into the framework dynamically. To add a new management service, an adaptor is needed to mediate between the framework and the management service being added. The new service is then plugged into the adaptor.

While this system allows for the addition of new services, it requires an additional adaptor for each new service. The presence of this intervening software layer may have a negative impact on performance. Furthermore, the necessity of creating such adaptors adds cost to the system. Finally, this system is specifically designed for network management; it does not provide for the common scenario in which the user interface through which the objects are browsed is on the same platform as the objects themselves.

U.S. Pat. No. 5,950,000 discloses a method and system for integrating third party tools into an integrated programming environment which supports control and data integration. In this system, the graphical user interface of the system manager is augmented with an icon representing a selected third party tool. The user interface also provides menus which are controlled to show objects and files that have been used recently, and through which tools they have been used. The tools and the system manager communicate through inter-process messaging to provide the information for display in the menus on the graphical user interface. Also, in this system, in order to integrate third party tools more closely with the system manager, the provider of a third party tool is provided with the option of writing "glue code" to ensure sufficient integration.

There are a number of problems inherent in this design. First, with respect to at least some tools, "glue code" is required to properly integrate the tool and the manager. The production of this code adds to the cost of the overall system. Second, the mode of communication between the third party tools and the system manager, namely, inter-process messaging, creates an extra layer of communication between the objects upon which the tools operate and the tools themselves. This can have a negative effect on performance of the system.

SUMMARY OF THE INVENTION

Therefore, what is desired is a system for producing, storing, viewing and/or manipulating objects, which system can preferably be efficiently used both in situations where the components of the system are located on a single server, and in situations in which the components of the system are based on separate platforms. Preferably, the system will be designed in a manner that reduces interdependencies between the components, and allows functionality to be added to the system efficiently and inexpensively. Also, preferably, the system will have these advantages while maintaining adequate performance.

The system will preferably include a user interface ("UI") configured to communicate with a repository in the form of a datastore. The datastore is connectable to one or more tools for manipulating representative objects within the datastore and the real-world objects which they represent. Preferably, the datastore is configured to update the UI when the contents of the datastore change, and to send commands to the tools when commands are issued from the UI. The system will preferably be usable both in a single standalone computer scenario and in a client-server scenario. In the standalone scenario, the UI, datastore and tools reside on a single computer. In the client-server scenario, the UI resides on a client and the datastore and tools reside on the server. The datastore is preferably configured to determine whether the system is in use on a single computer or distributed over a client and server. If the system is in use on a single computer, the datastore will preferably send updates via a standalone update path and commands via a standalone command path. In the client-server scenario, the datastore will preferably send updates via a client-server update path and commands via a client-server command path.

Most preferably, the sending of updates via a client-server update path comprises sending the update from the datastore to a virtual datastore on the client, and sending the update from the virtual datastore to the UI. The sending of commands via the client-server command path most preferably comprises sending the command from the virtual datastore to the datastore, and sending the command from the datastore to the tools. Thus, in the client-server scenario, the UI preferably communicates directly with a virtual datastore on the client. The virtual datastore preferably contains a copy of the contents of the datastore, as it is updated when the contents of the datastore are changed. Commands issued via the UI are preferably handled initially via the virtual datastore, which sends the commands to the datastore to be sent to the tools.

Preferably, the datastore will be configured such that all objects within the datastore are of the same kind, and thus have a predetermined uniform set of attributes. Because all of the objects in the datastore are of the same kind, information about an object in the datastore, including what type of object it is, can be ascertained only from its attributes The datastore preferably includes a schema comprising schema objects which define the object types that can reside in the datastore, relationship types between the object types, and command types executable upon each object type. Most preferably, the schema objects include object descriptors for defining object types, relationship descriptors for defining relationship types, and command descriptors for defining command types.

Preferably, the datastore is configured to permit the tools to augment the schema by creating and adding schema objects to the datastore. In this way, each tool can determine the schema and define object types, relationship types and command types necessary or desirable for its operation. Also, preferably, the UI is configured to perceive and comprehend the schema. The UI preferably uses the object types and relationship types defined in the schema to display the datastore objects and the relationships between them. The UI also preferably uses the object types and command types defined in the schema to provide command options to the user through the UI.

Therefore, according to one aspect of the invention there is provided a system for producing, storing and manipulating objects, the system comprising (a) a datastore, the datastore being connectable to a user interface, and to an object manipulation tool set comprising at least one tool, each tool in the tool set being connected to the datastore; (b) an object set contained in the datastore, the datastore being configured to require that all of the objects of the object set be of the same kind and have a predetermined uniform attribute set, the object set including a subset of schema objects; wherein the schema objects define object types that can reside in the datastore, relationship types between the object types, and command types executable upon each object type.

According to another aspect of the invention, there is provided a computer readable medium bearing instructions for realizing a system for producing, storing and manipulating objects, the instructions being arranged to cause one or more processors upon execution thereof to perform the following: (a) configuring a datastore to be connectable to a user interface and to an object manipulation tool set; (b) configuring the datastore so as to cause an object set, including a subset of schema objects, to be contained therein, and so as to require that all objects in the datastore to be of the same kind and have a predetermined uniform attribute set; wherein the schema objects define object types that can reside in the datastore, relationship types between the object types, and command types executable upon each object type.

According to another aspect of the invention, there is provided a system for storing and viewing objects, the system comprising: (a) a datastore containing datastore objects, the datastore incorporating a schema defining object types and relationship types between object types; (b) a user interface connected to the datastore, the user interface and the datastore being preconfigured to permit the user interface to perceive and comprehend the schema and to utilize the schema to identify and display the datastore objects and relationships between the datastore objects.

According to another aspect of the invention, there is provided a computer readable medium bearing instructions for realizing a system for storing and viewing objects, the instructions being arranged to cause one or more processors upon execution thereof to perform the following: (a) configuring a datastore so as to permit the datastore to contain datastore objects and to incorporate a schema defining object types and relationship types between object types; (b) configuring a user interface to connect to the datastore; and (c) preconfiguring the datastore and the user interface so as to permit the user interface to perceive and comprehend the schema and to utilize the schema to identify and display the datastore objects and relationships between the datastore objects.

According to another aspect of the invention, there is provided a method of updating a user interface for displaying the objects contained in a datastore, wherein the datastore and the user interface are part of a system for producing or manipulating objects in the datastore, the method comprising: (a) determining that the objects in the datastore have changed; (b) determining whether the user interface is located on a computer on which the datastore is located, or on a second client computer; (c) if the user interface is located on the computer on which the datastore is located, transmitting a datastore object update from the datastore to the user interface via a standalone update path; (d) if the user interface is located on the client computer, transmitting a datastore object update from the datastore to the user interface via a client-server update path.

According to another aspect of the invention, there is provided a method of transmitting a command to a tool to cause the tool to produce or manipulate one or more objects contained within a datastore, wherein the datastore and the tools are part of a system for producing or manipulating objects in the datastore, the method comprising: (a) issuing a command through a user interface; (b) determining whether the user interface is located on a computer on which the datastore is located or on a second client computer; (c) if the user interface is located on the computer on which the datastore is located, transmitting the command from the user interface to the tool via a standalone command path; (d) if the user interface is located on the second client computer, transmitting the command from the user interface to the tool via a client-server command path.

According to another aspect of the invention, there is provided a system for producing and manipulating objects, the system comprising:(a) a datastore containing datastore objects, the datastore being located on a server, the datastore being connectable to at least one tool for producing or manipulating objects; (b) a user interface, located on a client, the user interface being configured to display the datastore objects; (c) a client-server update path for transmitting an object update to the user interface in response to changes to the objects; and (d) a client-server command path for permitting a user to issue a command to the at least one tool.

According to another aspect of the invention, there is provided a computer readable medium bearing instructions for updating a user interface for displaying objects contained in a datastore, the instructions being arranged to cause one or more processors upon execution thereof to perform the following: (a) determining that the objects in the datastore have changed; (b) determining whether the user interface is located on a computer on which the datastore is located, or on a second client computer; (c) if the user interface is located on the computer on which the datastore is located, transmitting a datastore object update from the datastore to the user interface via a standalone update path; (d) if the user interface is located on the client computer, transmitting a datastore object update from the datastore to the user interface via a client-server update path.

According to another aspect of the invention, there is provided a computer readable medium bearing instructions for transmitting a command to a tool to cause the tool to produce or manipulate one or more objects contained within a datastore, the instructions being arranged to cause one or more processors upon execution thereof to perform the following: (a) issuing a command through a user interface; (b) determining whether the user interface is located on a computer on which the datastore is located or on a second client computer; (c) if the user interface is located on the computer on which the datastore is located, transmitting the command from the user interface to the tool via a standalone command path; (d) if the user interface is located on the second client computer, transmitting the command from the user interface to the tool via a client-server command path.

According to another aspect of the invention, there is provided a system for producing, storing and manipulating objects, the system comprising: (a) a datastore containing an object set, the datastore incorporating a schema defining object types, relationship types between the object types, and command types that can be executed on the object types; (b) a user interface connected to the datastore, the user interface being configured to permit a user to perceive the object set and issue commands thereon; the datastore being connectable to each tool in a tool set comprising at least one tool; the datastore being configured to permit the at least one tool to augment the schema; whereby the tools determine the meaning of the objects within the system and can change and augment the meaning of objects for the whole system.

According to another aspect of the invention, there is provided a computer readable medium bearing instructions for realizing a system for producing, storing and manipulating objects, the instructions being arranged to cause one or more processors upon execution thereof to perform the following: (a) configuring a datastore for containing an object set; (b) configuring the datastore to incorporate a schema defining object types, relationship types between the object types, and command types that can be executed on the object types; (c) configuring a user interface to be connectable to the datastore and to permit a user to perceive the object set and issue commands thereon; (d) configuring the datastore to be connectable to at least one tool; (e) configuring the datastore to permit the at least one tool to augment the schema; whereby the tools determine the meaning of the objects within the system and can change and augment the meaning of objects for the whole system.

BRIEF DESCRIPTION OF THE DRAWINGS

Reference will now be made, by way of example only, to drawings of the invention, which illustrate the preferred embodiments of the invention, and in which:

FIG. 7 is a tree showing the organization of the dataelements in accordance with the invention;

DESCRIPTION OF THE PREFERRED EMBODIMENTS

Figure 1:
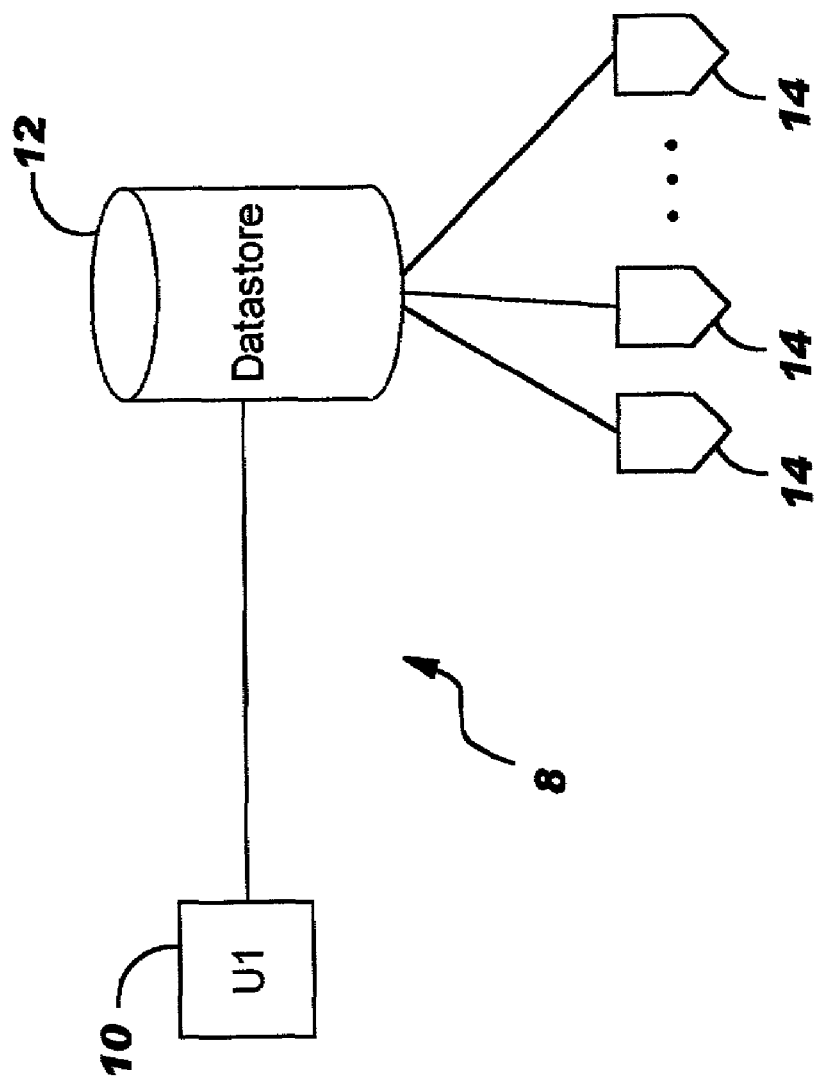
FIG. 1 is a schematic drawing of the system of the present invention.

Referring now to FIG. 1, a system 8 for producing, storing and manipulating objects according to the present invention is shown. The system 8 includes a user interface ("UI") 10 and a repository in the form of a datastore 12 connectable to an object manipulation tool set comprising tools 14. It will be appreciated that there will typically be at least one tool 14, but, as will be described in greater detail below, there may be any number of tools 14. The purpose of the tools 14 is to produce and manipulate objects within the datastore 12, as well as to produce and manipulate actual objects represented by objects within the datastore 12.

It will further be appreciated that, though an IDE is described herein as the preferred embodiment and by way of example, the system 8 being described is, more generally, a system for producing, storing and manipulating objects. Thus, there are many other possible embodiments of the system 8, which fall within the scope of this invention, but which are not IDEs. Thus, for example, the system for producing, storing and manipulating objects could take the form of a word processor, in which the UI allows the user to view objects which represent actual objects that make up the document being edited. The datastore would store the relevant representative objects, and the tools would be used to produce and manipulate representative objects in the datastore and actual objects as well. This system could also take other forms. What is important is that the system be structured so as to be capable of producing, storing and manipulating objects.

It will also be appreciated that, in this specification, "object" is not limited to the meaning of that term as used in relation to object-oriented programming languages. Rather, "object" refers simply to a data structure, and preferably includes both actual objects (file, directory, class, etc.) and datastore objects. The datastore objects preferably include both representative objects (which represent actual objects) and other objects such as schema objects, relation instance objects and command instance objects that will be described below in greater detail. Preferably, the tools 14 are for creating and manipulating both actual objects and datastore objects.

The UI 10 is connected to the datastore 12. The UI 10 permits the user to view the objects within the datastore 12. The UI 10 also functions to permit the user to issue commands to the tools 14 to produce and/or manipulate objects within the datastore 12.

The UI 10 communicates with the datastore 12, but does not directly communicate with the tools 14. Thus, commands issued via the UI 10 reach the tools 14 via the datastore 12. It will be appreciated that, in this way, the UI 10 is simplified, as it only needs to be designed for one interface, namely, the interface of the datastore 12. This simplification makes it easier to use a wide variety of user interfaces (such as, for example, web browsers), because the UI 10 can be relatively simple, and need not be capable of interfacing with a number of different tools 14. Furthermore, this structure reduces interdependency within the system 8. This is because the UI 10 does not interface with the tools 14. Therefore, a change in the tools 14 would not require a change in the UI 10 to facilitate direct communication with the new tools. Similarly, a change in the UI 10 would not require a change in the tools 14 to facilitate direct communication with the new UI.

The datastore 12 stores the datastore objects that are produced and manipulated within the system 8, and facilitates communication between the UI 10 and the tools 14. Thus, when a command is issued by the user through the UI 10, the datastore 12 is responsible for passing the relevant command to the appropriate tool 14 so that the command can be executed. The tools 14 are connected to the datastore 12 so as to allow the tools 14 to receive the required command information from the UI 10 through the datastore 12, and so as to allow the tools 14 to produce and manipulate objects within the datastore 12.

Figure 2:
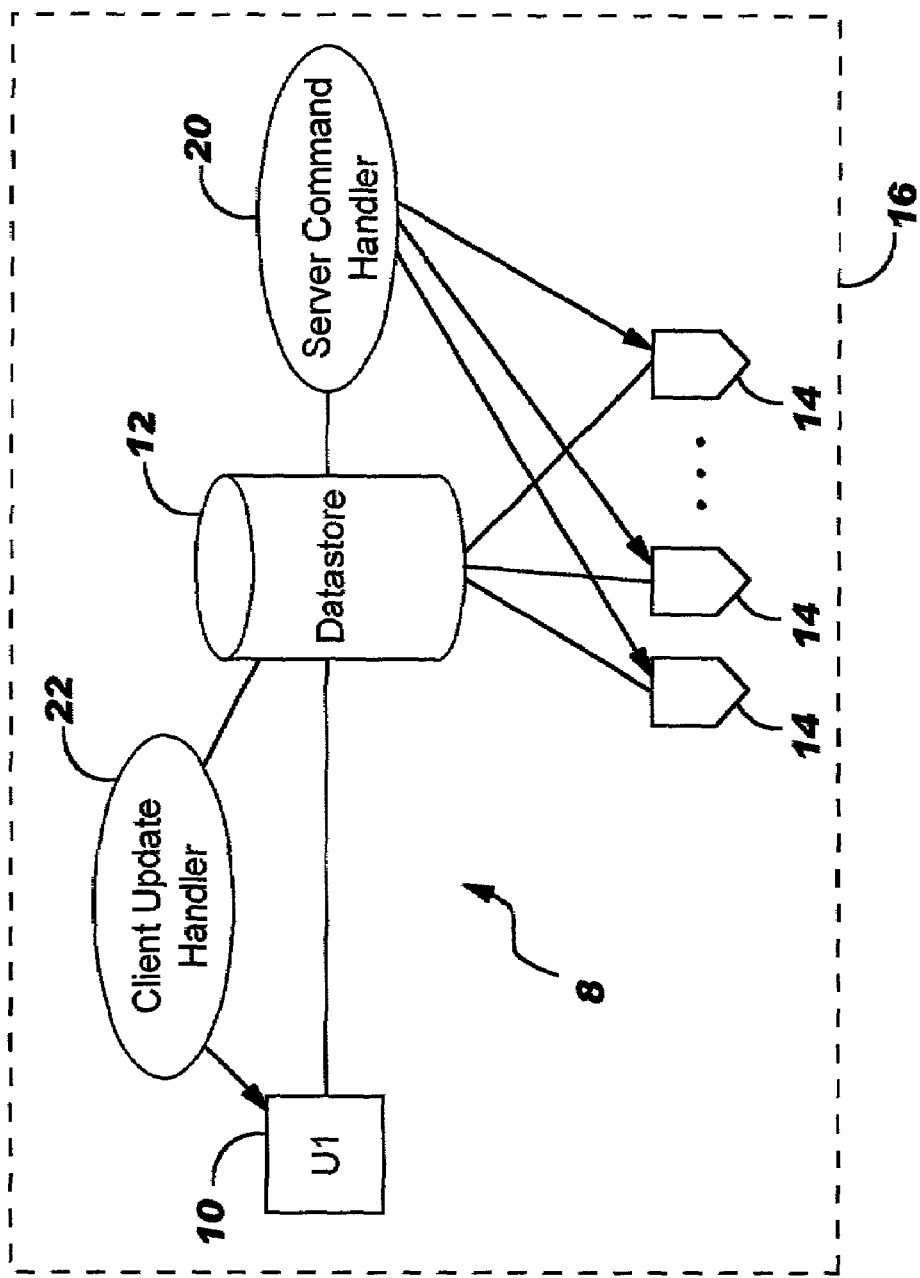
FIG. 2 is a more detailed schematic drawing of the system of the present invention.
Figure 3:
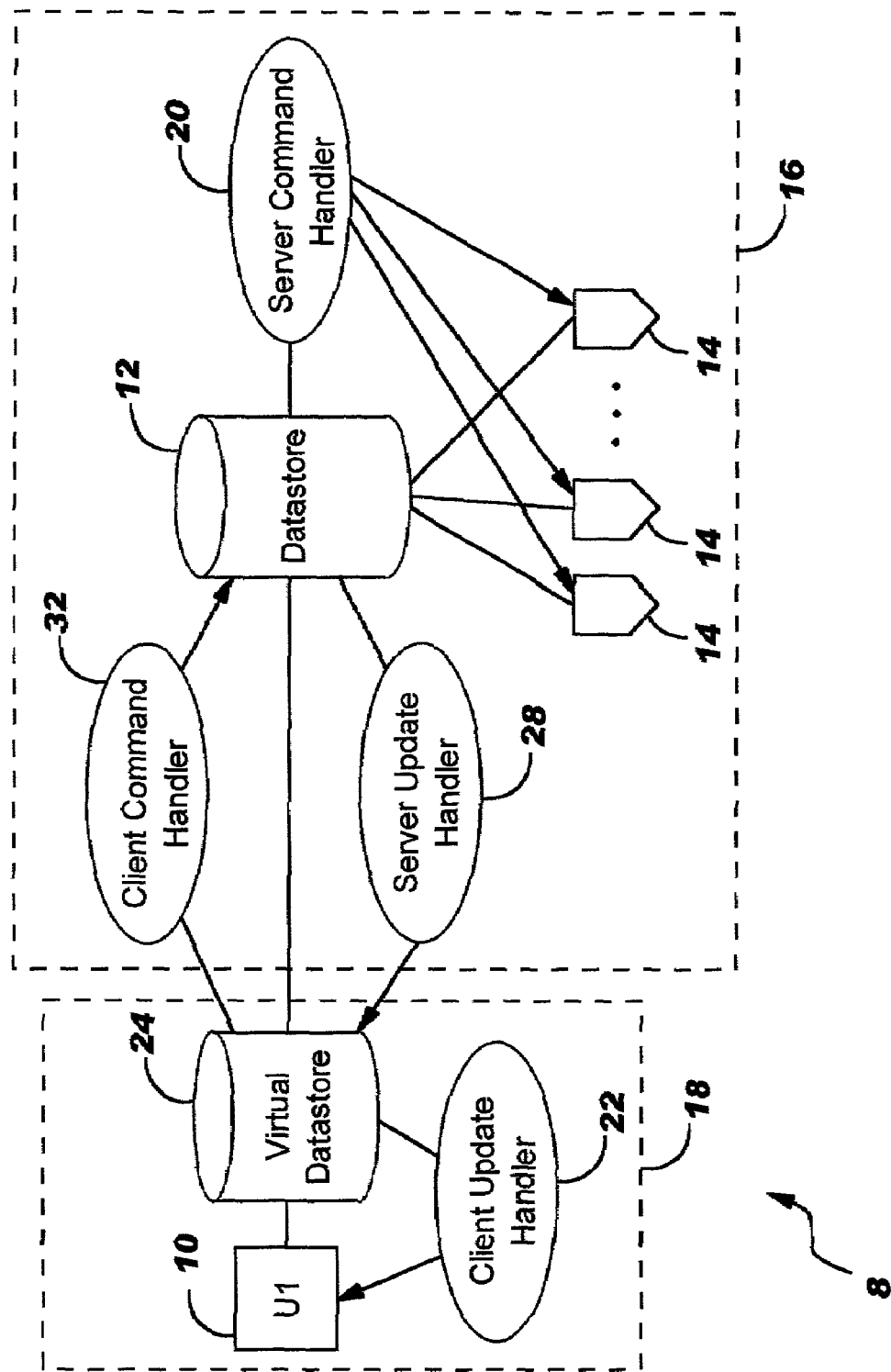
FIG. 3 is a detailed schematic drawing of the system of the present invention showing system components on different platforms.

FIG. 2 shows the system 8 where the UI 10, the datastore 12 and the tools 14 are all contained on a computer 16, which computer 16 is shown schematically by a dotted line. FIG. 3 shows the system 8 where the UI 10 is contained on a second client computer 18, which is shown schematically by a dotted line. In the scenario of FIG. 3, the computer 16 acts as a server and the datastore 12 and the tools 14 reside thereon.

In order to make communication between the components of the system 8 scalable and seamless, a general handler, preferably comprising a number of specific handlers (which will be described in greater detail below) are preferably used for communication between the UI 10 and the datastore 12, and between the datastore 12 and the tools 14. Handlers are preferably software threads, forked from the main thread of the system 8, which contain queues of requests, and which perform the queued requests at regular intervals. The size of these intervals can be adjusted by the user. As forked threads, the handlers operate asynchronously and independently of the main system thread.

It will be appreciated by those skilled in the art that the use of these preferred handlers provides a number of advantages. First, because the handlers perform requests asynchronously, the other operations of the system 8 can continue independently and without delay, even if a request previously queued on a handler has not yet been executed. Second, because the intervals between requests can be adjusted, the user can make them large enough to ensure that no one part of the system 8 becomes so bogged down with information received from a handler that it becomes unresponsive to other tasks required of it.

The system 8 as shown in FIG. 2 includes a server command handler 20 and a client update handler 22. The server command handler 20 functions to send command requests from the datastore 12 to the tools 14. The client update handler 22 functions to update the UI 10 when the data within the datastore 12 has been changed.

Thus, for example, suppose the user issues a command from the UI 10 that a selected file object within the datastore 12 be deleted. The datastore 12 ascertains the appropriate tool 14 for deleting files. Then, the datastore 12 places the command on the queue of the server command handler 20. The server command handler 20 then transmits the command to the appropriate tool 14. The tool 14, having received the command, deletes the selected file from the datastore 12.

Next, the datastore 12 determines that the objects contained within it have changed. As a result, UI 10 must now be updated so as to accurately reflect the changed contents of the datastore 12. Thus, the datastore 12 places the object update on to the queue of the client update handler 22, which transmits the object update to the UI 10 to reflect that the selected file has been deleted from the datastore 12.

The system 8 as shown in FIG. 3 has the UI 10 located on the client machine 18, while the datastore 12 and tools 14 are located on the server machine 16. To facilitate communication between the datastore 12 and the UI 10, a virtual datastore 24 is created on the client 18. The virtual datastore 24 is connected to the UI 10, and is initialized to contain a copy of the contents of the datastore 12. Furthermore, as will be described in greater detail below, the system 8 keeps the virtual datastore 24 updated so that it reflects the contents of the datastore 12 even when those contents change.

Thus, it will be appreciated that seamless communication to and from the UI 10 is maintained even in the client-server environment. The UI 10 is connected directly to the virtual datastore 24. Since the contents of the virtual datastore 24 are kept synchronized with those of the datastore 12, the UI 10 can use the same interface, regardless of whether the system is in use in a single workstation (standalone) environment (FIG. 2) or a two workstation (client-server) environment (FIG. 3). Thus, the UI 10 requires no special design feature to adapt it for use in the client-server environment.

This seamless communication is maintained in the client-server environment of FIG. 3 by the use of the handlers described above, plus additional handlers, namely, the server update handler 28 and the client command handler 32. In the client-server environment, communication between the components of the system 8 is carried out as follows. The server command handler 20 transmits commands from the datastore 12 to the tools 14. The server update handler 28 transmits an object update to the virtual datastore 24 when changes are made to the objects in the datastore 12, thus synchronizing the virtual datastore 24 with the datastore 12. The client update handler 22 updates the UI 10 when changes are made to the objects in the virtual datastore 24. The client command handler 32 transmits commands from the virtual datastore 24 to the datastore 12.

It can now be appreciated how the communication between the various components of the system 8 is carried out in the client-server environment. Using the previous example once again, suppose that a user issues a command through the UI 10 that a selected file be deleted. The UI 10 is not directly connected to the datastore 12, but rather, to the virtual datastore 24. Thus, the UI 10 transmits the command to the virtual datastore 24. In turn, the virtual datastore 24 places the command onto the queue of requests of the client command handler 32. The client command handler 32 transmits the command to the datastore 12. The datastore 12 receives the command and, in turn, transmits the command to the appropriate tool 14 for deleting the selected file object by placing the command in the queue of requests of the server command handler 20. Once the selected file has been deleted, and once the object in the datastore 12 representing the selected file is deleted from the datastore 12, because the contents of the datastore 12 have changed, the datastore 12 transmits an object update to the virtual datastore 24 via the server command handler 28, and the copy of the object representing the selected file is deleted from the virtual datastore 24. Then, because the contents of the virtual datastore 28 have changed, the virtual datastore 24 transmits an object update to the UI 10 via the client-update handler 22.

It will be appreciated that this structure maintains in the client-server environment the same seamless communication between the components that is achieved in the standalone environment. This is because, through the use of handlers, the same components of the system 8 can be used, and can be used in the same way, regardless of whether the system 8 is distributed over a client and a server, or localized on a single server. Thus, the UI 10 can be the same, whether the system 8 of FIG. 2 is used or the system 8 of FIG. 3. The UI 10 is configured such that, if a command is issued via the UI 10, the command transmitted through either the virtual datastore 24 or the datastore 12 via the relevant command handler(s). It is the responsibility of the handler to determine whether the system is being used in a standalone environment or in a client-server environment, and therefore, which specific handler should be used. The UI 10 need not be designed to know whether it is connected to the virtual datastore 24 or directly to the datastore 12, because, in either scenario, the UI 10 behaves in precisely the same manner. Similarly, the UI 10 is configured to receive object updates when the contents of the datastore 12 change. However, the UI 10 need not be configured to know whether the update is being received directly from the datastore 12 via the client update handler 22, or whether the update is being received through the virtual datastore 24 via the client update handler 22, because the UI behaves the same regardless. Thus, it will be appreciated that the same UI 10 of the system 8 is usable in both a standalone environment and a client-server environment.

Similarly, in the standalone environment, the datastore 12 receives commands directly from the UI 10, while in the client-server environment, that command is received from the UI 10 via the virtual datastore 24 and the client command handler 32. Thus, in both environments, the datastore 12 simply receives the commands issued through the UI 10. The functions within the datastore 12 which handle commands do not need to know whether the command was received directly from the UI 10, or whether it arrived from the UI 10 via the virtual datastore 24, because the datastore 12 will behave the same way regardless. Also, once the contents of the datastore 12 are changed by the tools 14, the datastore 12 will send an object update to the UI 10. The datastore 12 need not know whether the update travels to the UI 10 in one step via the client update handler 22, as happens in the standalone environment, or whether the update travels to the UI 10 in two steps via the server update handler 28, the virtual datastore 24, and the client update handler 22. Rather, the datastore 12 simply transmits the update via the handler, which is responsible for determining which environment obtains, and therefore, which specific handler should be used. Therefore, because of the use of handlers, and because of the use of a virtual datastore 24, the datastore 12 can have substantially the same design regardless of whether the system 8 is in use in the standalone environment or the client-server environment.

In the client-server environment, because the datastore 12 and the UI 10 are on separate platforms, the object updates and commands will preferably be transmitted over a network connection between the client 18 and the server 16. Most preferably, this transmission will be done using an XML link. In transmitting information across the network connection, the XML link serializes the information being transmitted into a series of strings known as XML tags. At the other end of the network connection, the tags are deserialized and the transmitted data reconstructed. The use of an XML link is most preferred because such a link can be efficiently implemented in conjunction with the preferred uniform object model for the datastore 12, which model will be described in more detail below.

It will now be appreciated that in the standalone environment, the object updates are transmitted from the datastore 12 to the UI 10 via a standalone update path. The standalone update path preferably comprises the client 25 update handler 22. Also, in the standalone environment, the commands are transmitted via the standalone command path, which preferably comprises the server command handler.

In the client-server environment, the object updates are transmitted via 30 the client-server update path, which preferably comprises the server update handler 28, a network connection including an XML link, the virtual datastore 24 and the client update handler 22. The commands are transmitted via a client-server command path, which preferably comprises a connection between the UI 10 and the virtual datastore 24, the virtual datastore 24, the client command handler 32, a network connection including an XML link, and the server command handler 20.

It will be appreciated that the standalone command and update paths and the client-server command and update paths need not be in the preferred forms described above to fall within the scope of the invention. For example, it is not necessary that an XML link be used. Also, it is not strictly necessary that handlers be used, though that is preferred. What is important is that the UI 10 can receive object updates via both a standalone update path (corresponding to the standalone environment) and a client-server update path (corresponding to the client-server environment), and that tools 14 can receive commands via both a standalone command path (corresponding to the standalone environment) and a client-server command path (corresponding to the client-server environment).

It will also be appreciated that, if a general handler is used, it is not necessary that it take the form described above, though that is preferred. Rather, what is important about the general handler (and the specific handlers that may comprise it) is that it function to transmit updates and commands between the components of the system 8.

In the system 8 of the standalone environment (FIG. 2), the handler used to update the UI 10 is the client update handler 22. Thus, even though there is no client 18 in this environment and only a server 16, the UI 10 is updated by the client update handler 22, and not the server update handler 28. This nomenclature is used for consistency, because in the client-server environment, the UI 10 is updated directly by the client update handler 22, while the server update handler updates the virtual datastore 24. Thus, it will be appreciated that the chosen nomenclature is consistent with the functions of the two update handlers in both environments.

Figure 4:
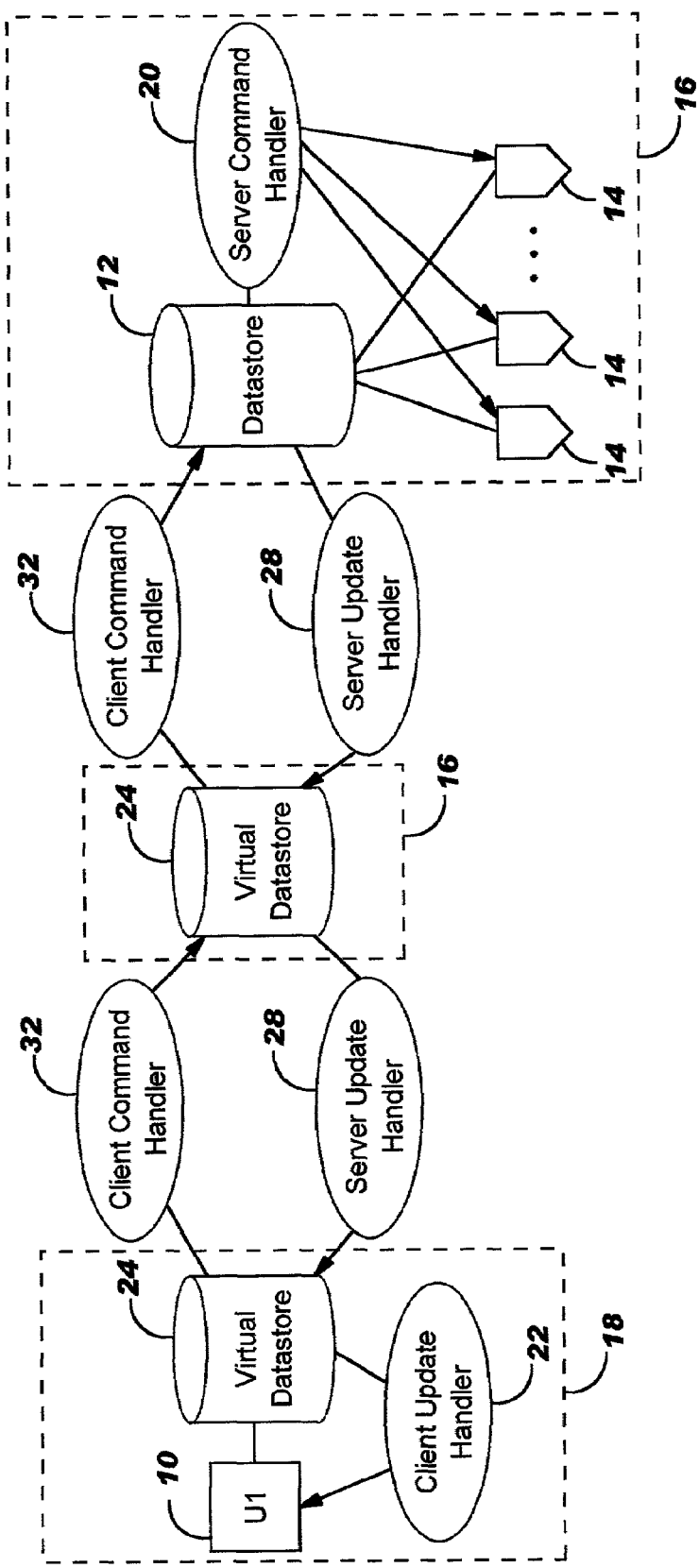
FIG. 4 is a schematic of the system where at least two servers are connected in series to a client.
Figure 5:
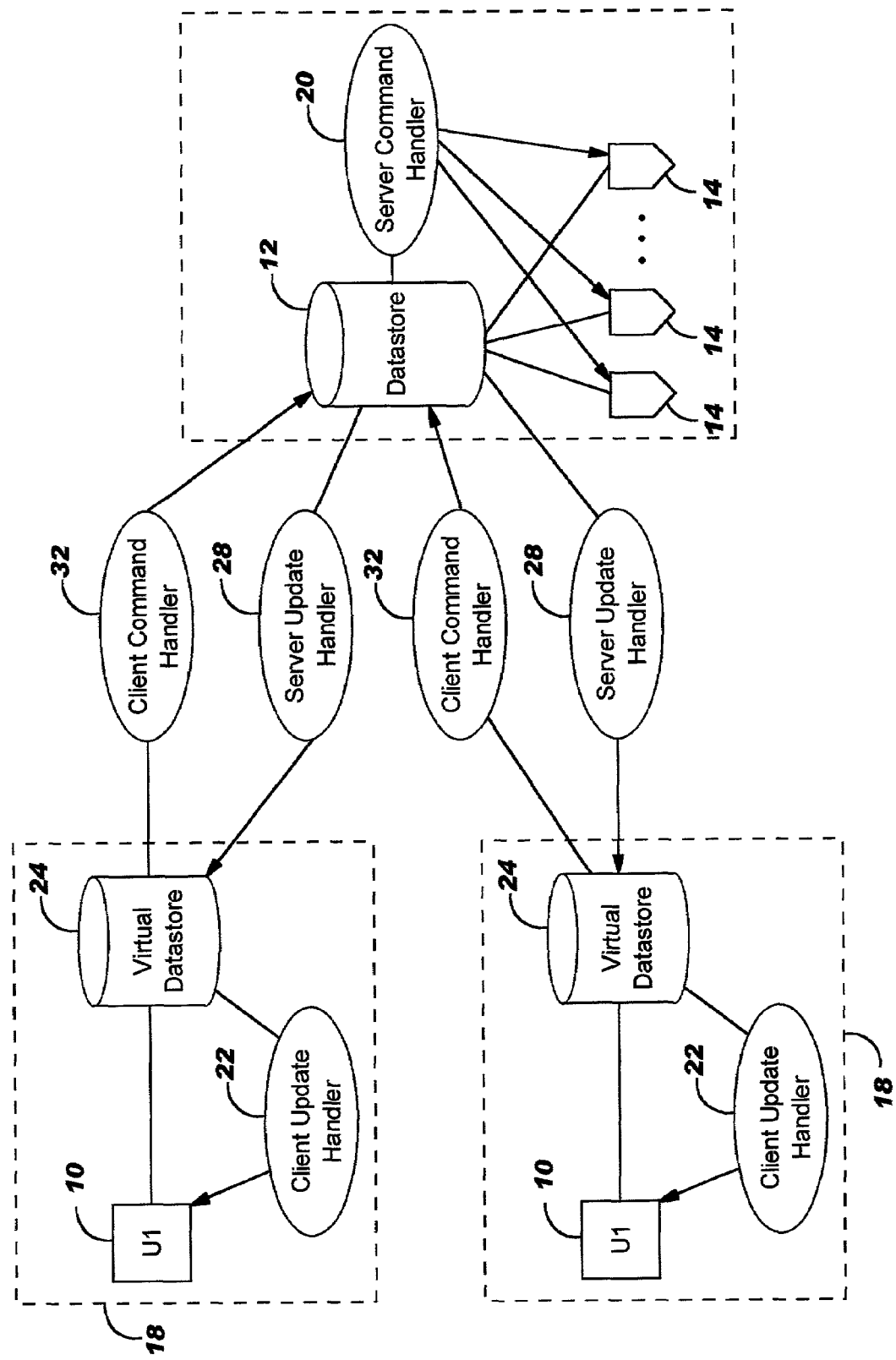
FIG. 5 is a schematic of the system where at least two clients are connected to a server.

It will be appreciated that the system 8 as described above is also adaptable for use in environments where the datastore 12 is located on a server, which is connected through one or more computers to a client computer, which client computer holds the UI 10. Such a design is shown in FIG. 4. In such a multiple-platform environment, the datastore 12 and virtual datastores 24 receive commands via client command handlers 32. The tools 14 receive commands via a server command handler 26. The virtual datastores 24 are updated via server update handlers 28, and the UI 10 on the client is updated via a client update handler 30. The system 8 operates in this environment in the same way as described above with respect to the two-platform client-server environment, except that the transmission of commands and updates requires additional steps corresponding to the additional platforms located between the client 18 housing the UI 10 and the server 16 containing the datastore 12.

Similarly, the system 8 as described above is adaptable to an environment in which each of a plurality of clients 18 is connected to a server 16. Each client has a UI 10 and a virtual datastore 24. The server 16 contains the datastore 12. In this design, the UI 10 on any of the clients can be used to issue a command in the same manner as described above. When the datastore 12 is updated, the server update handler 28 updates the virtual datastore 24 on all of the clients. This is accomplished by providing the server update handler 28 with a list of clients connected to the server. The server update handler 28 is thus able to transfer updated object information to all of the clients 18 connected to the server 16.

Preferably, the datastore 12 is configured such that every object in the datastore is of the same kind. For ease of reference, these uniformly structured objects will be referred to as dataelements 40. Thus, every object within the datastore 12 is an object of the same kind, dataelement. Therefore, preferably, every object in the datastore 12 has the same predetermined set of attributes, and there are no objects within the datastore 12 having any attributes other than the predetermined attribute set that makes up the uniform structure. It will be appreciated that, given that there is only one kind of object in the datastore 12, and that all objects in the datastore therefore have a predetermined uniform attribute set, all information about an object comes from its attributes.

Figure 6:
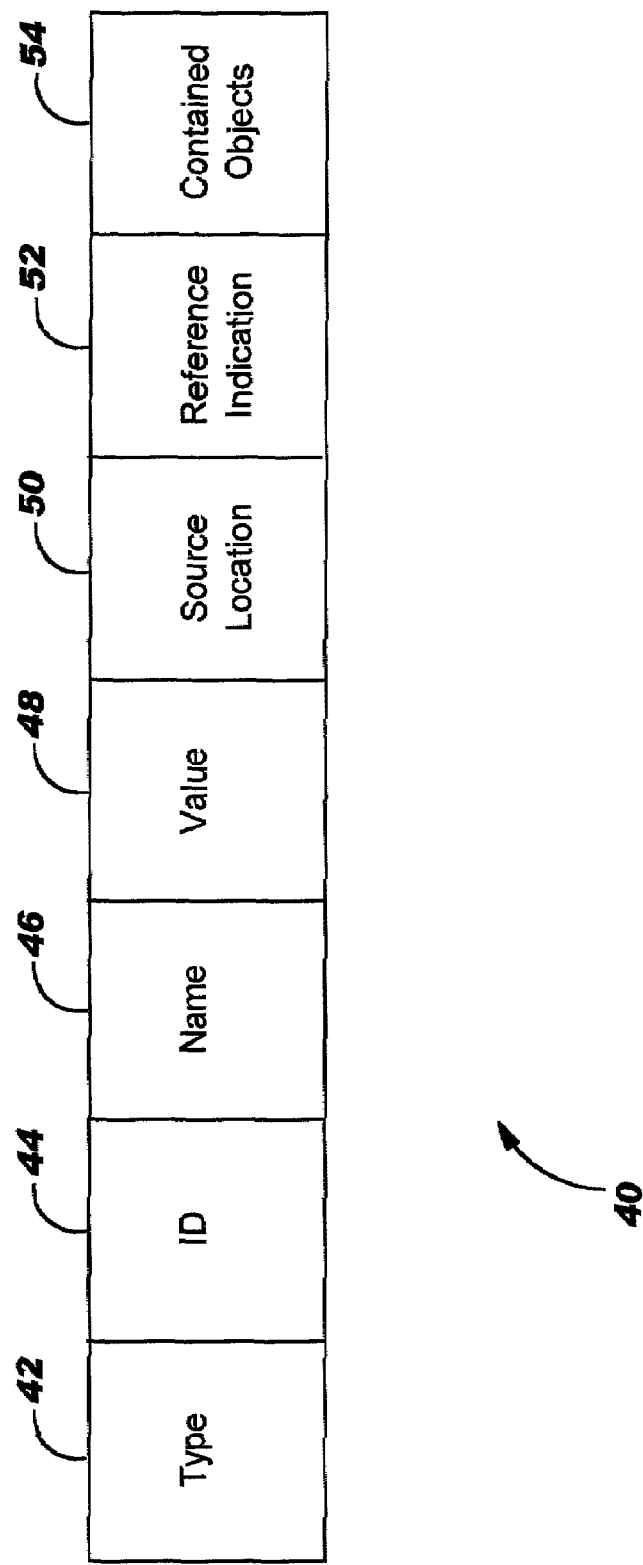
FIG. 6 is a conceptual diagram of a dataelement in accordance with the invention.

FIG. 6 shows the preferred form of dataelements 40. In the most preferred embodiment, the dataelement will include the following set of attributes: a type attribute 42, an ID attribute 44, a name attribute 46, a value attribute 48, a source location attribute 50, a reference indication attribute 52 and a contained objects attribute 54. The type attribute 42, the ID attribute 44, the name attribute 46 and the value attribute 48 are represented by strings. There are a variety of ways in which the information contained in these attributes can be used. The use of this information in the preferred embodiment will be described in greater detail below.

It will be appreciated that the uniformity of attributes of the dataelements allows for superior performance of the XML link described above. The XML link operates by serializing the object attributes into XML tags, transmitting them, and rebuilding the transmitted object by deserializing the tags. When the structure of objects being sent over the link is unpredictable, then the software that runs the XML link can be designed to account for this unpredictability. However, in the preferred embodiment, because every object has the same structure, the XML link can be designed without the extra complexity needed to deal with unpredictable object structure. The result is that the XML link software is less complex, better-performing and faster.

The source location attribute 50 is represented by a string, and in the preferred embodiment, gives information as to the physical location of the objects. As will be explained in greater detail below, with respect to command objects, the source location attribute 50 will contain the source location of the tool 14 that implements the command.

The reference indication attribute 52 is simply an indication of whether the object is a reference or not. It will appreciated that a reference object is an object that refers to another object. Reference objects are used to explicitly indicate relationships between other objects.

The contained object attribute 54 is a list of pointers to all of the objects contained within the dataelement 40. This attribute provides a method for showing a contents relationship between objects without creating an explicit reference object to show the relationship explicitly. Thus, a contents relationship between objects can be indicated implicitly via the contained object attribute 54, or explicitly by creating a reference object. In the preferred embodiment, only contents relationships can be indicated implicitly. All other types of relationships must be shown through the creation of a reference object.

The datastore 12 preferably incorporates a schema, which most preferably comprises a subset of schema objects within the set of objects in the datastore 12. The schema objects define the types of objects that can reside in the datastore 12, the types of relationships that can exist between different types of objects, and the types of commands that can be executed on each different type of object.

In the preferred embodiment, the three types of schema objects are object descriptors, relationship descriptors and command descriptors.

An object descriptor is an object within the datastore that represents an object type and provides information about the object type. There is a single base or generic object descriptor which represents, generally, the object-descriptor object type. Conceptually, this generic object descriptor represents the idea of an object. In addition, other specific object descriptors represent specific object types (e.g. file, directory, class, device, etc.). In the preferred embodiment, both the generic object descriptor and the specific object descriptors are objects of type "object descriptor". This is because all object descriptors function as descriptors of objects. The name attribute of object descriptors is used to indicate which type of object is described by the object descriptor. Thus, the generic object descriptor also has "object descriptor" as its name attribute, because it represents object descriptors generally. By contrast, the object descriptors representing specific types of objects each have a name attribute which corresponds to the specific type of object being described. So, for example, the class object descriptor would be of type "object descriptor", and have the name "class". Similarly, the file object descriptor, representing file objects, would have the type attribute "object descriptor" and the name attribute "file".

Object descriptors are related to one another by explicit or implicit relationships which mirror the relationships between the types of objects represented by the object descriptors. For example, files are contained within directories. To indicate this relationship, the directory object descriptor will contain the file object descriptor. This relationship will preferably be shown explicitly through the use of a reference object showing a "contains" relationship.

It will be appreciated that, through this arrangement of the object descriptors, information is provided about the various possible object types, including the relationships that they can have with one another.

A relationship descriptor is a dataelement within the datastore 12 that represents a possible type of relationship between object types. As with object descriptors, there is a single base or generic relationship descriptor that represents, generally, relationship descriptors. In other words, the generic relationship descriptor conceptually represents the idea of a relationship. In addition, there are other specific relationship descriptors which represent specific kinds of relationships. Like the generic relationship descriptor, these specific relationship descriptors have as their type attribute "relationship descriptor". However, their name attribute corresponds to the specific type of relationships represented by the relationship descriptor. So, for example, a relationship descriptor representing the inheritance relationship has its type attribute "relationship descriptor" and as its name attribute "inheritance".

Part of the function of the schema is to define what relationship types each object type can have. In the preferred embodiment, the relationship descriptors representing relationship types are contained (explicitly or implicitly) within the object descriptors representing object types which can have the types of relationships represented by the relationship descriptors. Thus, for example, a class object can have an inheritance relationship, because, as will be appreciated by those skilled in the art, classes may generally inherit attributes from other classes. To represent this possible relationship, the class object descriptor explicitly or implicitly contains the inheritance relationship descriptor.

As another example, it will be appreciated that object descriptors are capable of containing other objects. This, as described above, is how possible relationships between different object types are shown. Therefore, to indicate the possibility of this type of relationship, the generic object descriptor (i.e. the object descriptor with the name attribute "object descriptor" and the type attribute "object descriptor") contains the relationship descriptor representing the contains relationship. This defines within the schema that object descriptors can contain objects.

Command descriptors represent command types that may be executed on various object types. The set of command descriptors contains a base or generic command descriptor that represents command descriptors generally. In other words, it conceptually describes the idea of a command. This generic command descriptor has the name attribute "command descriptor" because it represents command descriptors and the type attribute "command descriptor", because it functions to describe commands.

Other specific command descriptors represent specific types of commands. Because they function to describe commands, they have the type attribute "command descriptor". Because they represent specific types of commands, they will have name attributes corresponding to the specific command type. So, for example, a query command descriptor is an object having as its type attribute "command descriptor" and as its name attribute a string corresponding to this type of command, such as "Query" or "C_QUERY".

Object descriptors are related to command descriptors by contents relationships. This is how the schema defines which command types can act on which object types. For example, the directory object descriptor would contain (explicitly or implicitly) the query command descriptor, thus indicating that a query command can be executed on a directory. If this relationship between the directory object descriptor and the query command descriptor were not shown in the schema, a user (as will be described in more detail below) would not have the option of querying directories within the system 8.

As described above, it is the tools 14 that implement commands to be executed upon the dataelements. Therefore, in the preferred embodiment, each specific command descriptor will contain an indication of which tool 14 is used to implement the type of command represented by the command descriptor. Most preferably, the command descriptor will contain, as its source attribute, a string giving the physical location of the tool 14 that is used to implement the type of command represented by the command descriptor. So, for example, the query command descriptor would have as its source attribute the location of a file system tool which is used for preforming query commands. Similarly, the parse command descriptor would have as its source attribute the location of a parser tool.

In the most preferred embodiment, the datastore 12 will be configured to include so as to include abstract object descriptors, abstract relationship descriptors and abstract command descriptors. These are descriptors that have "abstracts" relationships with specific descriptors, and the abstracts relationship is shown in the schema in the same way other relationships are. These abstract descriptors are used for more efficient creation and management of a large schema object tree. An abstract object descriptor is an object descriptor representing a number of different object descriptors, all of which inherit one or more characteristics (such as relationships or commands) from the abstract object descriptor. So, for example, an abstract object descriptor called "container object" can be created, which would abstract all the object descriptors that represent a type of object that can contain other objects (class, directory, project etc.). The container object can then be used to contain a "contains" relationship descriptor, thus indicating in the schema that all of the object types abstracted by the container object have a "contains" relationship.

Abstract relationship descriptors can be used in a similar fashion. For example, there may be a number of objects that have both a "contains" and a "uses" relationship (directory, device etc.). The object descriptors representing these object types can contain the "contains/uses" abstract relationship descriptor abstracting the "contains" and "uses", thus indicating that they can each have both of these types of relationships.

Abstract command descriptors can be used to bundle a number of different command types which, as a group, are associated with a one or more object types. Thus, file system commands such as "delete", "rename", "copy" and "move" are all typically associated with directories. Thus, the directory object descriptor can contain an abstract command descriptor called "File System Command" which abstracts the "delete", "rename", "copy" and "move" commands, thus indicating that all of these commands can be executed on a directory. It will be appreciated that the abstract descriptors can be used to reduce the number of objects used to create the schema, by providing a method of bundling object, relationship and command types.

A general abstract object descriptor, a general abstract relationship descriptor and a general abstract command descriptor are placed in the schema. Specific abstract object descriptors, abstract relationship descriptors and abstract command descriptors are created with reference to the general ones, in the same manner that other specific descriptors are created.

As described above, the schema objects define for the system 8 the types of objects that can reside in the datastore 12, the possible types of relationships between the different object types, and the possible command types that could be executed on the different object types. Apart from schema objects, however, the datastore 12 will typically contain dataelements 404 that are instance objects. Unlike the schema objects, the instance objects do not define the meaning of the dataelements. Rather, the meaning of the instance objects is defined by the schema.

There are preferably three types of instance objects. These are object instance objects (or simply "objects" or "instance objects" for short); relation instance objects (or simply "relations" for short); and command instance objects (or simply "commands" for short).

Object instance objects are instances of object types that are represented by an object descriptor. For example, the datastore 12 may contain a dataelement representing the specific directory "directory1". Being a directory, this instance object is of a type represented by the directory object descriptor. In other words, the directory object descriptor provides information about all "directory" objects. Thus, this instance object representing the specific directory "directory1", to indicate that that is the specific directory that it represents, may have as its name or value attribute the string "directory1". The same object will have as its type attribute the string "directory". This indicates what type of instance object it is—a directory. If it is necessary for the system 8 to find information to about this instance object, it can obtain that information not only by looking at the attributes of the instance object itself, but by using the type attribute of the instance object, namely, "directory", to look up the directory object descriptor, which will provide information about the directory type of object. Specifically, once the relevant object descriptor for the instance object is found using the type attribute of the instance object, it is possible to determine what relationships the instance object may have and what commands may act on it.

Like schema objects, instance objects are related to one another by explicit or implicit relationships. For example, if the file "file1" is contained within the directory "directory1", then the instance object representing the "directory1" directory will contain the instance object representing the "file1".

Another type of instance object is a relation instance object. A relation instance object is an object of a type that is represented by a relationship descriptor. Relation instance objects are used to reference other instance objects or schema objects contained within the datastore. For example, when the directory "directory1" contains the file "file1", a relation instance object may be used to represent the relationship between the specific directory and the specific file. In the preferred embodiment, this relation instance object would have as its type attribute "contains" or some other string that represents a contains relationship, because the directory "directory1" contains the file "file". To obtain information on the nature of this relation, the type attribute of the relation instance object (i.e. "contains") can be used to look up the relationship descriptor that is named "contains", this being the relationship descriptor that represents a "contains" relationship and provides information about the nature of this type of relationship within the schema.

Also in the preferred embodiment, relation instance objects have as their name attribute the ID of the object that they reference. Thus, in the above example, the relation instance object would have as its name attribute the ID of the instance object representing the file "file1". To obtain information about the object that a relation instance object references, the relation can be dereferenced by simply looking up the ID of the referenced object using the ID specified in the name attribute of the relation instance object.

It will be appreciated that the use of the ID of the referenced object in the name attribute of the relation is not specifically necessary. For example, the referenced object could be identified by having its ID in some other attribute of the relation, such as the value attribute. What is important is that the relation contain within it some information which indicates the identity of the referenced object.

It will also be appreciated that relation instance objects can be used to explicitly indicate the presence of a relationship between any two objects, as long as the type of relationship has a relationship descriptor.

A command instance object is an object of a type that is represented by a command descriptor. Command instance objects are used to represent specific commands that are to be performed on one or more specific dataelements 40. For example, a "delete" command is an instance of the delete command descriptor. A command instance object will typically be operating on a specific dataelement. Thus it will typically contain a reference which indicates an argument relationship to the dataelement, which dataelement is passed to the relevant tool 14 as an input. Thus, for example, the delete command would contain an argument relation referencing the dataelement to be deleted. Some commands may require more than one argument. It will be appreciated that there is, in theory, no limit to the number of arguments that a command can reference.

Because the delete command is an instance of the delete command descriptor and is described by it, the command has, as its type attribute, the name of the delete command descriptor, which is "delete". Furthermore, because the delete command is an instance of the delete command descriptor, it will preferably have as its source attribute the source location of the tool 14 that executes delete commands, which in this case is a file system tool.

It will be appreciated that the strings that have been used for the various attributes of the dataelements are somewhat arbitrary. To illustrate, in the example just given, the type attribute of the delete command descriptor was given as "delete". This string is preferred, because its plain meaning corresponds to our understanding of the function of the command type that it represents. Furthermore, as will be described in more detail below, the UI 10 displays some attributes of the dataelements, such as the name attribute. However, from the standpoint of functionality, the string could be anything. What matters is that the string be known in advance and used consistently across the various dataelements. So, as just described, when a command instance object is to be executed, the appropriate tool 14 is located by looking up the relevant command descriptor. However, the relevant command descriptor can only be looked up if the string in the type attribute of the command instance object is the same as the string in the name attribute of the command descriptor. Therefore, it is important that, regardless of what specific strings are used to represent the various attributes of the various dataelements, consistency is maintained.

It will also be appreciated that the number of attributes that are possessed by the dataelements is somewhat arbitrary as well. In constructing the dataelement, it is desirable to provide enough attributes to allow for the various schema and instance objects to perform their functions within the datastore. To do so, there must be enough attributes within the dataelement to allow the dataelement to carry an adequate amount of information. However, once that is accomplished, adding more attributes may unnecessarily waste memory. The preferred dataelement structure described above is intended to give the dataelements the capacity to carry sufficient information while not wasting memory.

It will further be appreciated that, though instance objects and schema objects have been described as being substantially different, the difference lies mostly in how the objects are used, not in any fundamental difference in character between schema objects and instance objects. In fact, in the preferred embodiment, all objects in the datastore 12 are uniformly structured dataelements having the same attributes. Thus the difference between the types of objects relates to what information is contained in their various attributes and how that information is used. Furthermore, in the preferred schema model described above, even schema objects are, in a sense, instances. For example, the file object descriptor, though a schema object, is an instance of the generic object descriptor. In fact, even the base schema objects have type attributes that are the same as their name attributes. Thus, they are, in effect, instances of themselves. One result of this uniformity in structure among the objects is that schema objects can be manipulated in the same way as instance objects if desired. So, for example, just as instance objects can be operated on by commands, so can schema objects. One possible command that might be useful for acting on schema objects is an "edit descriptor" command. Given an appropriate tool 14 for implementing such a command, a user could be given the flexibility to alter a schema object while the system 8 is running.

The dataelements within the datastore 12 are preferably organized so as to allow the efficient execution of various basic functions, such as searching, object creation, persistence, and communications. There are a variety of different possible methods for organizing the objects within the datastore 12, and the choice of method will depend on a variety of factors, including the use to which the system 8 is being put.

FIG. 7 shows an example of the preferred mode of organization for the schema. As will be appreciated, the preferred mode of organization is a tree structure under three roots: the schema root 60, the host (or data) root 62, and the log root 64. It will be appreciated that FIG. 7 is not a complete illustration of all of the dataelements, but rather an illustration of how the dataelements may be organized.

The schema root 60 contains the schema objects; therefore, all information under this root is used to describe the different types of objects in the datastore 12, the relationship between these types of objects, and the commands that can be executed on each type of object. Each object contained under this root is either an object descriptor, a relationship descriptor or a command descriptor. Some of these descriptors contain relations which indicate the relationships that the particular type of object can have and the commands that can be executed on it.

The host root 62 contains the system data for the system 8. In the preferred embodiment, the host object (i.e. the object at the top of the host root) specifies an IP address for a particular machine and a starting point within the memory of the machine to indicate where the objects in the host root can be found.

In the preferred embodiment, most instance objects will be contained under the host root. Objects representing the tools 14 are also located under the host root. The purpose of these objects is mainly organizational in nature, in that instance objects related to a particular tool 14 can be placed in the host root under the object representing the particular tool 14.

Storing tool-specific information under the specific tool's subroot has the advantage of facilitating the delegation of responsibility for managing and persisting tool-specific object information to the tool 14. However, this mode of organization does not prevent any of the tools 14 from manipulating, creating and referencing objects contained outside the subroot specific to the tool 14.

The log root 64 contains a log of activities or events during a session of the system 8. Anytime a command is performed, it is recorded in the log root. Because commands are instance objects, they can be used to provide information within the datastore 12 as to the status of the command. For example, if a query command is issued on a directory, a command instance object is created. To keep track of the status of the command, a status object is preferably included as an object related to the command. The commands, along with their related status objects, can be stored on the log root 64 to provide a log of the activities of the system 8. The status object can be modified at any point during the command to provide information such as execution time, or status information, such as "done", "in progress", "incomplete" etc.

The operation of the tools 14 will now be described in greater detail. It will be appreciated that the tools 14 can have a wide variety of functions, and their specific design will depend in large measure on the specific use to which the system 8 is being put. In the preferred embodiment, the system 8 is an IDE. In this embodiment, examples of possible tools 14 that might form part of the system 8 include a C++ parser tool, a file system tool, a code generator tool, a search tool and a command tool.

A C++ parser tool is a tool that parses C++ code. Thus, objects within the datastore 12 representing projects, directories, files or parse objects can be passed to the parser tool as an input to a parse. During the parse, the parser tool 14 will populate the datastore 12 with objects representing the parse information that the parser tool has extracted, such as classes, functions, variables etc.

The file system tool is used to browse directories and files and perform various actions on directories and files. These actions can include various basic file system functions such as create, delete, rename, copy, move, query, etc. Objects representing devices, directories and files can be passed to this tool as inputs. The file system tool then determines via the APIs of the file system within the datastore 12 the necessary information (such as, for example, the contents of a directory) and returns the relevant information. As another example, the name of a directory to be created can be passed into the file system tool, and the tool will then populate the datastore 12 with an object representing the new directory, and physically create the new directory.

The code generator tool allows a user of the IDE system 8 to generate C++ source code. An object representing a new file and an object representing a class are passed to the code generator tools as inputs. The tool can then recreate C++ source code in the specified file for the given class.

The search tool provides various generic searching algorithms on data elements in the datastore 12. The object to search (such as a file, directory or project), an object representing a text search pattern, and objects representing object types are all inputs to the search tool. The tool then searches for, matches and returns the search results, preferably by creating a reference between the status object and the search results.

The command tool is a tool that allows users to issue shell-based commands. An object representing a directory and an object representing an invocation are inputs to the tool. The tool creates a shell in the given directory, receives the invocation, collects the shell output and returns it.

It will be appreciated that there can be any number of tools 14 connected to the datastore 12, and that different tools 14 can be connected at different times. Therefore, in the preferred embodiment, the system 8 maintains a system configuration file which lists the tools 14 which are loaded at runtime. Thus, for a particular session, the user can edit the configuration file to add or remove tools so as to ensure that all desired tools 14 are available for the session, and that any tool 14 that is not desired will not be loaded.

Preferably, each tool 14 has only three possible interfaces that are implemented, namely, extendschema( ), Load( ) and handlecommand( ). These interfaces will now be described in detail.

As described above, the system 8 comprises a UI 10, datastore 12 and tools 14. The purpose of the tools 14 is the carrying out of commands issued by the user in respect of objects in the datastore 12. Preferably, in the system 8, the datastore 12 is initialized with a minimal schema that contains just enough information for the schema to understand itself, and for very primitive functions. Each tool 14 is responsible for augmenting the schema by adding its own schema to the minimal base schema initially contained in the datastore 12. This is achieved by the datastore 12 calling extendschema( ) on each tool. The root schema object is passed as an argument into extendschema( ), thus allowing the tool 14 to locate the schema root and add its own schema objects thereto.

For example, the C++ parser tool defines the objects, and relationships between objects, that are needed for its parsing function, as well as objects that are specifically desired for parsing C++ code (as opposed to code in another language). It may also define how the tool is to be used by extending other schemas, such as that of the file system, with command descriptors. For example, the C++ parser tool will create in the datastore 12 object descriptors representing "class", "function", "variable", as well as the relationship descriptors that represent the relationships between these types of objects. It will also extend the file system tool by creating the "parse" command descriptor and associating it via relation instance objects with the "file" and "directory" object descriptors that are contributed by the file system tool. This allows the C++ parser tool to parse files and directories, as well as classes.

As another example, when extendschema( ) is called in respect of the file system tool, the file system tool will create the schema objects necessary to give meaning to the file system. These would include, for example, object descriptors representing "directory" and "file", and relationship descriptors representing the relationships possible between directories and other directories, and between directories and files. Finally, these would include command descriptors representing the commands that would be carried out by the file system tool, such as, inter alia, a command descriptor representing the query command.

Thus, in the system 8, the task of creating the schema is preferably delegated to the tools 14. Furthermore, the APIs of the tools 14 are preferably limited to the three interfaces listed above, namely, extendschema( ), load( ) and handlecommand( ). This can be contrasted to traditional systems, in which the schema is often predetermined and tools are written to work in accordance with the predetermined schema. It has historically been assumed that, in designing a framework (including schema and APIs), there are two competing factors to be weighed. On the one hand, a rigid framework can minimize potential problems in respect of the design, creation and operation of tools, and can also result in strong tool performance. This is because, in a rigid framework, the meaning of objects is rigidly predefined, the APIs are predetermined and limited and tools can be designed simply. They need only be able to cope with predetermined expectations of how they will be used. However, a rigid framework is inflexible in the sense that its system can generally only be used for purposes which were anticipated when the framework was created. Adapting a system with a rigid framework to unanticipated uses generally requires extensive effort and substantial modification.

By contrast, a flexible framework allows unforeseen usage scenarios to thrive, and the associated system can usually be adapted relatively easily to different purposes. However, tools for use with flexible frameworks are generally complex and are likely to perform more poorly as a result. This is because the tools need to be written in a manner that allows them to cope with the unexpected usage scenarios and unexpected object types that can arise in a system with a flexible framework.

It will be appreciated that the system 8 is structured with the intention of maximizing the advantages generally attributed to both rigid and flexible schemas, while minimizing the disadvantages of both scenarios. In the system 8, in order to allow the tools 14 a full range of flexibility, the task of creating a schema is delegated to the tools 14. This renders it unnecessary for a complex schema to be designed in advance. Furthermore, the writers of the tools 14 will generally know more than schema developers about the objects the tools will be working with, the way they will use them and how they relate to other objects. Writers of the tools 14 will also know which of their tools' functionality they want to expose to a user and which they do not.

Through the use of the extendschema( ) function and the creation of its own schema objects, each tool 14 can determine for itself the extent of its own functionality within the system 8, the manner in which it will interpret the meaning of objects within the datastore 12, and the commands that a user can use to implement the functionality of the tool 14. It will be appreciated that allowing each tool 14 to contribute its own schema provides great flexibility in the use of the system 8. In effect, a tool 14 can be written to implement virtually any function, whether anticipated or not. Since the tools 14 are responsible for building the relevant portion of the schema, there is no preexisting rigid schema that would prevent the implementation of unanticipated functionality. Because the tools 14 themselves determine the schema, they can thus create a schema consistent with virtually any desired functionality.

It will also be appreciated, however, that the preferred embodiment is structured so as to avoid the primary disadvantages normally associated with flexible schema, namely, an increase in complexity and a decrease in performance. There are two reasons for this. First, because the tools 14 themselves are responsible for determining the schema, the extent to which these tools must be able to cope with unexpected usage scenarios is sharply reduced. After all, since the task of determining the schema is left to the tools 14, the tools 14 will know in advance what the schema will look like.

The second reason is the uniform structure of objects within the datastore 12. As described above, in the preferred embodiment, objects in the datastore are limited to a predetermined uniform attribute set. Therefore, it is impossible for any object in the datastore to have an irregular attribute structure. Rather, every object will have the same attributes. Thus, tools 14 that are written for the system 8 can be written specifically for objects having the precise structure of the uniform model. This reduces complexity because the tools 14 do not need to be designed to be able to cope with objects having irregular or unexpected structures, since no such objects exist. When a tool 14 receives an object as an input, it knows in advance that the objects will have only the predetermined set of attributes. It also knows from the schema, to which it contributed, what the meaning is of the specific information contained in the objects.

Thus, flexibility is maintained because the tools 14 determine the schema, and can thus specify any desired functionality for themselves. Meanwhile, the complexity and diminished performance which typically accompany a flexible schema are diminished in the preferred embodiment because the tools 14, having determined the schema, are written specifically for it, and because the objects in the datastore 12 have a predetermined attribute set to which the tools 14 can be specifically tailored.

The next interface that may be implemented in the tools 14 is the load( ) interface. This can be implemented by a tool 14 after extendschema( ) is implemented but before any commands are executed. The purpose of the load( ) function is to allow the tool 14 to populate the datastore 12 with instance objects that will be useful to it when the time comes to execute a command. Thus, for example, the file system tool may, after its extendschema( ) function is implemented, populate the datastore 12 with some objects which have as yet not been used. The purpose of doing so is simply to give the user something to work with when the session begins. So, for example, if the system is being used on a computer with a C:\ drive and a D:\ drive, the file system will preferably, when its load( ) function is running, create objects in the datastore representing those devices in order to permit a user to use those devices.

It will be appreciated that, unlike the other interface of the tool 14, the Load( ) function is not strictly necessary. Rather, it can be implemented for the purpose of efficiency and/or convenience if the nature of the tool 14 is such that the Load( ) function would be beneficial.

The third interface implemented in the tools 14 is the handlecommand( ) function. This is common to all of the tools 14, and is the process by which commands are executed by the tools 14.

As discussed above, commands are instances of command descriptors. When a command is issued by the user through the UI 10, the datastore 12 creates a command instance object. The command instance object is created by reference to the schema. The command descriptor representing the type of the command contains the source location of the appropriate tool 14 to execute the command. Once the appropriate tool 14 is ascertained, the tool's handlecommand( ) function is implemented.

When this function is implemented, the tool 14 receives the command. Once this happens, it is the job of the tool 14 to interpret the command. In some cases, the tool 14 only has the functionality to execute one type of command. In these cases, it will not be necessary for the tool 14 to determine what type of command has been issued. In other cases, however, the tool 14 executes more than one type of command (e.g the file system tool). In that case, the tool 14 will have to determine what type of command it has received. The tool 14 can obtain this information the same way the datastore 12 does, namely, by looking up the relevant command descriptor.

The structure of a query command is shown below for illustration:

```
"C_QUERY" command
    ->argument relation to "directory1"
    ->"start" status
        ->"123" start time
```

This command instance object, the "C_QUERY" command, has other objects nested within it. Specifically, the "directory1" directory is the first argument, as that is the directory to be queried.

The second argument is a status object. In the preferred embodiment, every command has a status object as an argument, and the status object is used to store the state of the command. In this way, the user can keep track of the status of commands. This also facilitates the keeping of a system activity log, as described above.

In addition, in the preferred embodiment, the status object can be used to provide synchronous update and command handling. As described above, the update and command handlers operate asynchronously. However, in the preferred embodiment, the handlers are configured such that their sending of queued requests can be tied to the status object of a previous request, such that no more requests will be sent until that status object has been changed to "done", or some other predetermined value. Thus, the system provides a choice between asynchronous and synchronous handling of updates and commands.

Once the tool 14 has interpreted the command, including its arguments, with reference to the schema, the tool then proceeds to execute the command. Depending on the command, this may involve creating objects within the datastore 12, manipulating existing objects, or deleting objects.

In the preferred embodiment, the datastore 12 will be configured so as to provide an update function. Thus, when the tool 14 makes changes to the contents of the datastore 12, the tool 14 can call the update function of the datastore 12. The datastore 12 would then issue an object update via the update handlers as described above. In addition, once the tool 14 has completed its task, it changes the status object to "done" to indicate that the command has been completed.

Figure 8:
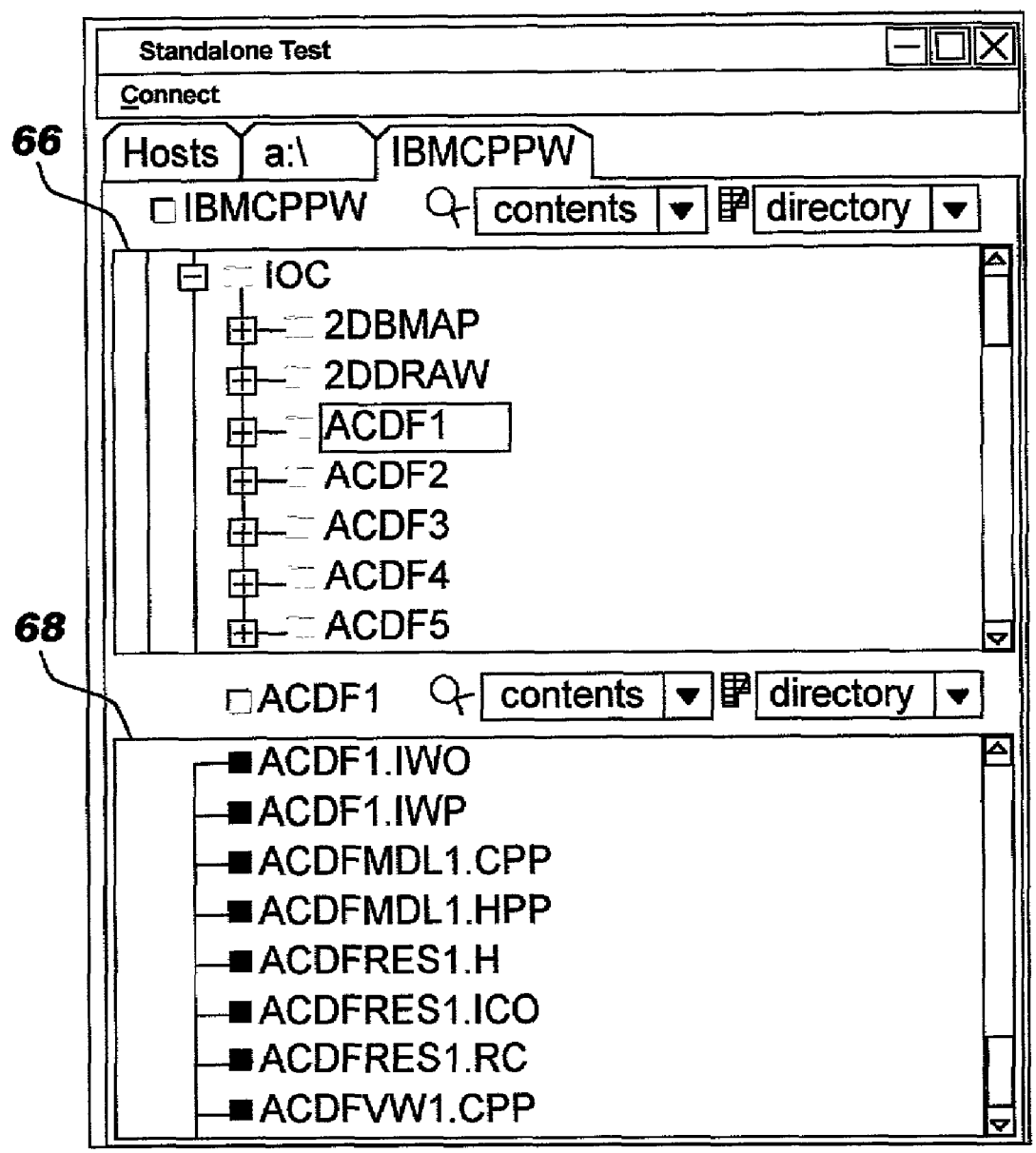
FIG. 8 is a screen shot of a user interface showing dataelements.

FIG. 8 is a screenshot of a UI 10 consisting of a generic tree-viewer control that issues a query command each time a tree item is selected or expanded. The user had previously selected the IOC directory. The file system tool received the command from the framework within the datastore 12. The file system tool found the contents of the IOC directory and populated the datastore 12 with dataelements 40 representing those contents. Finally, the datastore 12 updated the UI 10, and the list of objects contained within the IOC directory was displayed in the top viewer 66.

It will be appreciated that, in the preferred embodiment, interaction between the UI 10 and the datastore 12 is handled by the datastore 12 and the framework contained therein. The tools 14, by contrast, are preferably responsible for the production and manipulation of dataelements, and interact only with the datastore 12.

Thus far, the tools 14 have primarily been described as functioning to produce and manipulate instance objects. However, it will be appreciated that, because all dataelements 40, including schema objects, are of uniform structure, and because the tools 14 create their own schema by augmenting the base schema, tools can change the schema even as part of their handlecommand( ) function. Thus, for example, a schema tool could be added which modifies the schema during runtime. This would be useful in situations where it is desirable to modify the schema dynamically.

It will be recalled that the schema objects include object descriptors, relationship descriptors and command descriptors. Instance objects describe specific instances of object descriptors, relation instance objects describe instances of relationships and command instance objects describe instances of command descriptors.

Furthermore, as described above, because of the way that the schema objects are organized, it can be determined what type of relationships the instance object can have, the types of objects that can be associated with the instance object for a particular relationship, and the commands that can be performed on the object.

Figure 9:
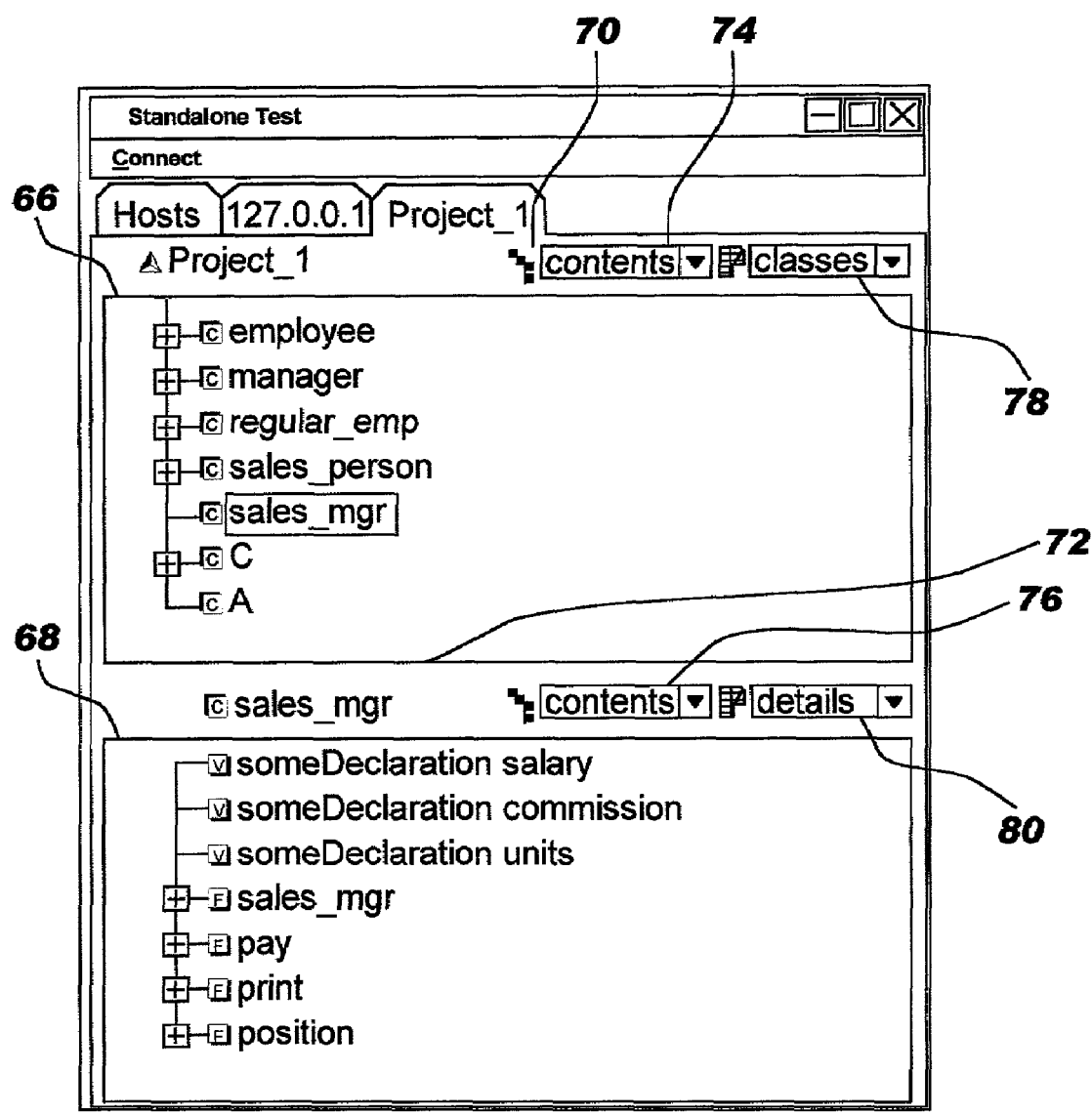
FIG. 9 is a screen shot of a user interface showing dataelements.

It can now be appreciated how the information provided by the schema is available to allow a user to use the UI 10 to browse the information contained in the datastore 12. FIG. 9 is a typical screen view from a UI 10 according to the present invention. The input object to the top viewer 66 is an object named "project_1". The bottom viewer 68 has an input object named "sales_mgr", which is selected within the top viewer 66. In the top viewer 66, the input object "Project_1" is shown at the left side of the top viewer toolbar 70. In the bottom viewer 68, the input object "sales_mgr" is shown at the left side of the bottom viewer toolbar 72.

Both viewers 66,68 also have a relations menus 74,76. Finally, both viewers 66, 68 have objects or filter menus 78, 80. The purpose of the relations menus 74, 76 is to cause the UI 10 to display objects that have the selected relationship with the input object of the each viewer. So, for example, in FIG. 9, the contents relationship has been selected from the relations menu of the top viewer 66 so that objects that have a contents relationship with the input object "project_1" are shown.

The objects menu provides the user with a choice of what types of objects are displayed in the viewer. In FIG. 9, in the top viewer 66, classes are selected within the object menu 78. As a result, only classes are shown in the viewer. Because the contents relationship is selected in the relations menu 74, the only objects shown in the top viewer 66 are classes that have a contents relationship to the input object, "Project_1".

It will be appreciated that the bottom viewer 68 works in a similar fashion. In the preferred embodiment of the UI 10 shown in FIG. 9, the bottom viewer 68 has as its input object the object selected within the top viewer 66. The bottom viewer 68 is also provided with a relations menu 76 and an objects menu 80. The relations menu 76 determines what relationships are to be displayed in the bottom viewer 68. The objects menu 80 determines what types of objects are to be displayed in the bottom viewer 68, in light of the selection in the relations menu 76.

It will be appreciated that the choices available within the relations menus 74, 76 and the objects menus 78, 80 are determined by the possible relationships that the input objects can have, as well as the possible types of objects that can be related to the input object. As described in detail above, all of this information is available from the schema objects. Thus, when an input object for a viewer is selected, the UI 10 calls an API of the datastore 12, which in turn determines from the schema objects what relations are associated with the input object and populates the relations menu accordingly. The datastore 12 also determines from the schema object what types of objects can be related to the input object, and the objects menu is populated with all of the types of objects that can have the selected relationship with the input object. . Then, from the identity of the input object, the selected relationship in the relations menu, and the selected object type from the objects menu, the UI 10 determines what the contents of the viewer should be and displays it.

Figure 10:
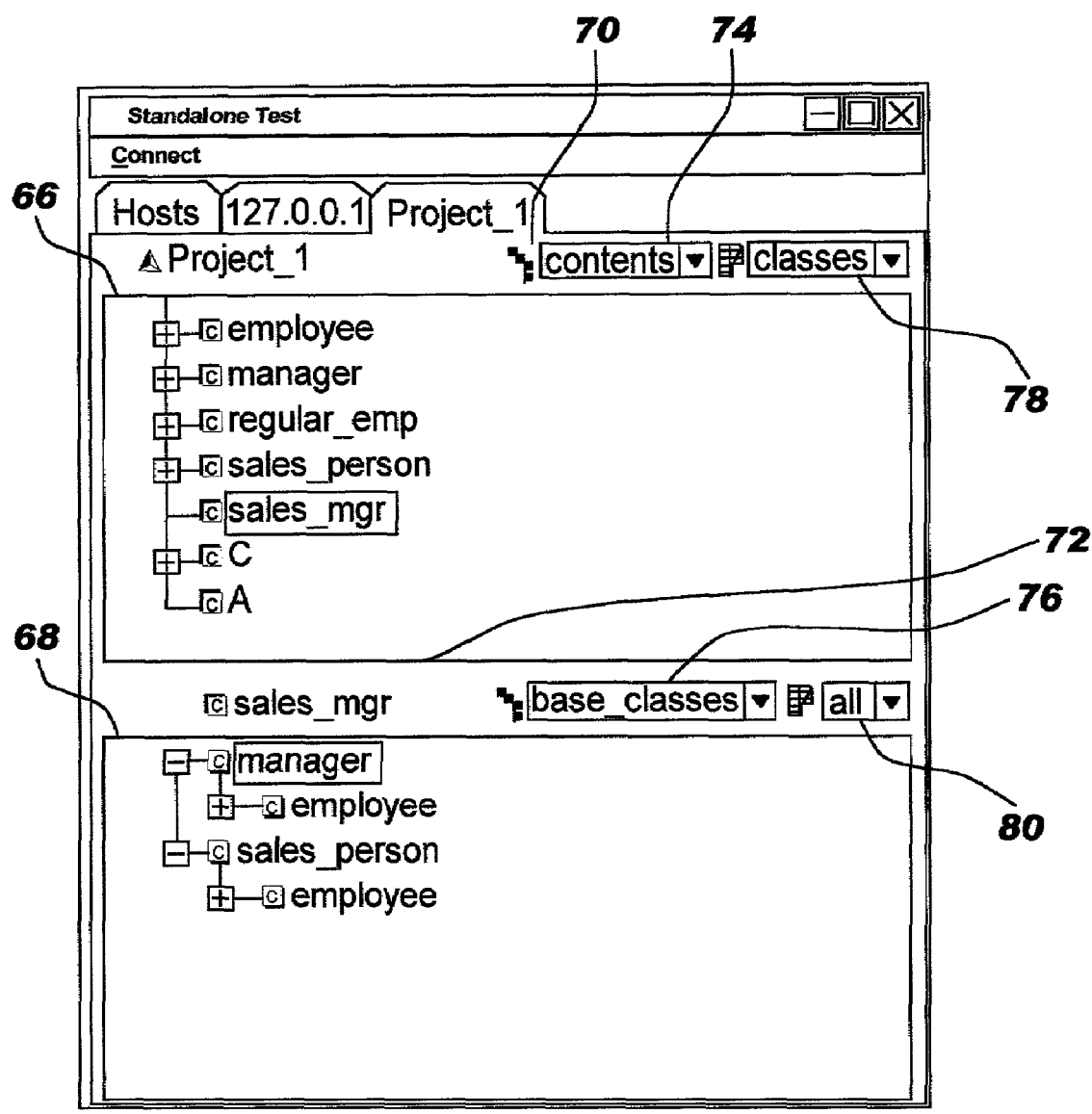
FIG. 10 is a screen shot of a user interface showing dataelements.

When any one of the variables is changed within the UI 10, the view provided by the UI 10 will change accordingly. An example is shown in FIG. 10. The top viewer 66 has remained the same as in FIG. 9, as have the selections in the relations and objects menus of the top viewer 66. However, the selection in the relations menu 76 of the bottom viewer 68 has been changed from "contents" to "base_classes". In FIG. 9, the contents of the selected class "sales_mgr" were displayed in the bottom viewer 68. In FIG. 10, in the bottom viewer 68, the base classes of the input object "sales_mgr" of the bottom viewer 68 are now shown.

It will be appreciated that, similarly, if the selection in the objects menu is changed, the viewer will change accordingly. Furthermore, if the input object of a viewer is changed, not only will the contents of the viewer change accordingly, but the selections available from the relations menu and the objects menu will change in accordance with the type of the new input object., because the UI 10 will as described above call an API of the datastore 12, which will in turn provide information from the schema.

Figure 11:
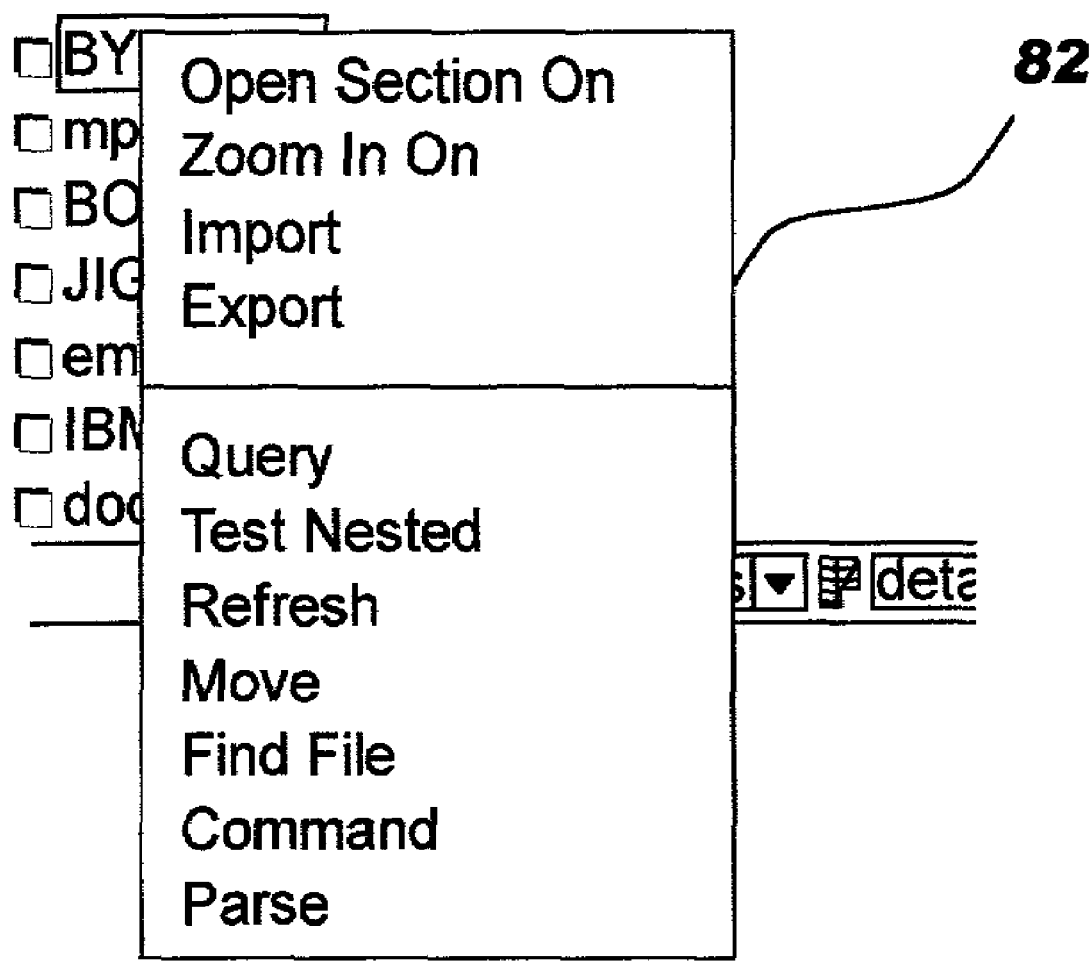
FIG. 11 is a screen shot of a command pop-up menu.

It can now also be appreciated how the UI 10 can make use of the information contained in the schema objects in order to provide command options to a user using the UI 10. FIG. 11 shows an example of the operation of the UI 10 in relation to commands. In the example shown in FIG. 11, when an item in the viewer is selected, the datastore 12 can determine from the schema objects what commands are available for execution on the selected object, in the same way that the contents of the relations and object menus are determined. Those commands, as shown in FIG. 11, will then preferably appear in a pop-up menu 82 in the UI 10. If another object is selected, for which other commands are available, those other commands will appear.

Furthermore, it will be appreciated that the UI 10 can determine from the schema (through the datastore 12) whether an additional argument is required to allow a command to be executed. For example, if the user selects "Command", which requires an "invocation" argument in addition to the subject, a dialogue box can be shown by the UI 10 to allow the user to provide the additional information. The UI 10 knows through the datastore 12 whether additional information is required by how the command is represented in the schema objects and related to other schema objects.

It will be appreciated that in the preferred embodiment, a generic, tree-viewing UI 10 will often be sufficient for the system 8. That is because the schema objects contained in the datastore 12 provide all of the information required for the UI to organize the dataelements in its display. In a typical prior art UI, the views available for the UI would have to be conceived of in advance, and code written to provide those views. However, in the preferred UI 10 of the present invention, as described above, the UI 10 is preconfigured to perceive schema information provided by the datastore 12, comprehend it, and provide the appropriate object type options and relationship options. The UI 10 also similarly displays that command types that can be executed on the objects in the datastore 12. Of course, as described above, the objects in the datastore represent actual objects, so that when a command is executed on an object in the datastore, this causes the actual object to be affected accordingly.

The UI 10 is "preconfigured" in the sense that no additional code is required to allow the UI 10 to display the datastore objects after the schema is created. Rather, the UI 10 is preconfigured to perceive and comprehend the schema through the datastore 12 regardless of what precise schema is later created by the tools 14. If the schema changes, the UI 10 will still be able to display the objects in the datastore 12 without additional code being written.

It will further be appreciated that the preferred embodiment of the system 8 has a significantly reduced level of interdependency among its components. The UI 10 is generic, in the sense that it simply provides its views based on information obtained from the schema. The datastore 12, as discussed above in detail, does not contain a rigid or otherwise predetermined schema. Rather, it serves simply as a repository for the schema objects created by the tools 14. The system 8 is primarily driven by the tools 14, in that they determine the schema and perform all of the object creation and manipulation tasks.

It will further be appreciated that the system 8 is sufficiently flexible that a user can customize the development environment of the preferred embodiment in accordance with his specific needs. The reason for this is that the schema is determined almost entirely by the tools. Thus, a tool 14 which performs virtually any function can be written and used with the system 8. For example, if a user wishes to use the system 8 for C++ development and for Java development in another language, the user can use a C++ code generator tool for C++ development, and simply use a Java code generator tool for Java development. This can be done without altering any other components of the system 8.

It will be appreciated that while the present invention has been described in the context of a system for creating, storing or manipulating objects, the system, processes and methods of the present invention are capable of being distributed in a computer program product comprising a computer readable medium that bears computer usable instructions for one or more processors. The medium may be provided in various forms, including diskette, compact disk, tape, chips, wireline transmission, satellite transmission, Internet downloading and the like. The computer usable instructions may also be in various forms, including compiled and non-compiled code.

Embodiments of and modifications to the described invention that would be obvious to those skilled in the art are intended to be covered by the appended claims.

The embodiments of the invention in which an exclusive property or privilege is claimed are defined as follows:

1. A system for producing and manipulating objects, the system comprising:
   (a) a datastore containing datastore objects, the datastore being located on a server, the datastore being connectable to at least one tool for producing or manipulating objects;
   (b) a user interface, located on a client, the user interface being configured to display the datastore objects;
   (c) a client-server update path for transmitting an object update to the user interface in response to changes to the objects; wherein the client-server update path comprises:
      a virtual datastore, located on the client, the virtual datastore being initialized to contain a copy of the datastore objects;
      a server update handler for transmitting an object update from the datastore to the virtual datastore, the virtual datastore being configured to update the copy in response to the object update; and
      a client update handler for transmitting an object update from the virtual datastore to the user interface; and
   (d) a client-server command path for permitting a user to issue a command to the at least one tool.

2. The system of claim 1, wherein the client-server update path further comprises a network connection between the server and the client, and wherein the server update handler is configured to transmit the object update over the network connection.

3. The system of claim 1, wherein the server update handler is configured to receive and queue requests including a request to transmit the object update, and to perform the requests, including the request to transmit the object update, at predetermined intervals.

4. The system of claim 3, wherein the server update handler is configured so as to permit adjustment of the intervals.

5. The system of claim 1, wherein the client update handler is configured to receive and queue requests including a request to transmit the object update, and to perform the requests, including the request to transmit the object update, at predetermined intervals.

6. The system of claim 5, wherein the client update handler is configured so as to permit adjustment of the intervals.

7. The system of claim 1, wherein the client-server command path comprises:
- a virtual datastore, located on the client, the virtual datastore being initialized to contain a copy of the datastore objects;
- a user-interface-virtual-datastore connection for transmitting the command from the user interface to the virtual datastore;
- a client command handler for transmitting the command from the virtual datastore to the datastore;
- a server command handler for transmitting a command from the datastore to the at least one tool.

8. The system of claim 7, wherein the client-server command path further comprises a network connection between the server and the client, and wherein the client command handler is configured to transmit the command over the network connection.

9. The system of claim 7, wherein the client command handler is configured to receive and queue requests including a request to transmit the command, and to perform the requests, including the request to transmit the command, at predetermined intervals.

10. The system of claim 9, wherein the client command handler is configured so as to permit adjustment of the intervals.

* * * * *